Oct. 13, 1931.    W. F. HUNDEMER    1,827,432
FLEXIBLE JOINT
Filed Dec. 27, 1923
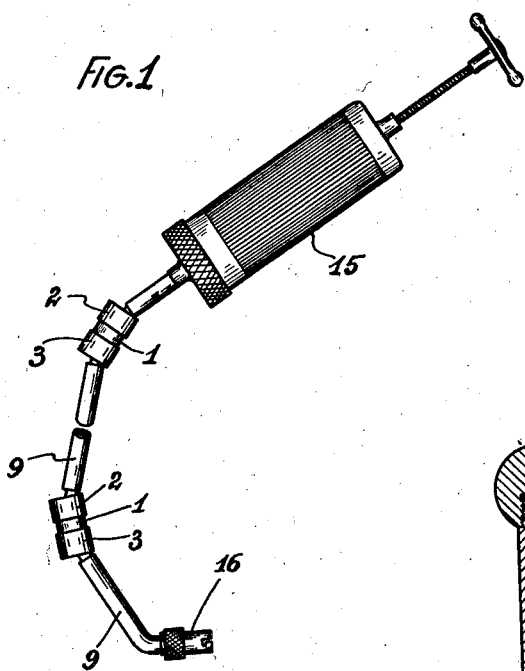
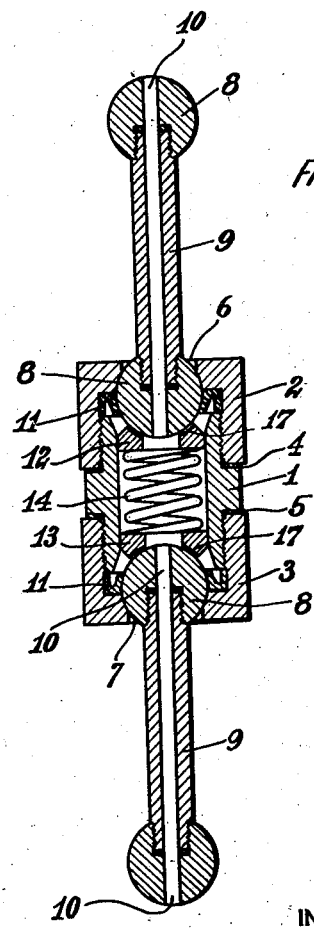
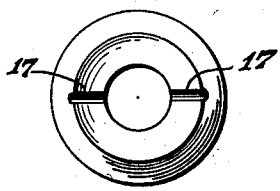
INVENTOR
WALTER F. HUNDEMER
BY
Harry C. Schroeder
ATTORNEY Patented Oct. 13, 1931

1,827,432

UNITED STATES PATENT OFFICE

WALTER F. HUNDEMER, OF ALAMEDA, CALIFORNIA, ASSIGNOR, BY MESNE ASSIGNMENTS, TO GAT GUN LUBRICATING CORPORATION, OF OAKLAND, CALIFORNIA, A CORPORATION OF CALIFORNIA

FLEXIBLE JOINT

Application filed December 27, 1923. Serial No. 682,933.

The invention relates to pipe couplings or joints of the ball-and-socket type, and has for its object to provide a coupling suitable for connecting short sections of pipe to form a flexible conduit capable of resisting high internal pressures. More specifically, the invention is designed for use with grease guns wherein a metallic conduit is substituted for the usual rubber hose which leads from the gun to the part which is to be lubricated.

Another object is to provide a joint which is simple in construction and effective in operation. In the joint I use a tubular body on the opposite ends of which are caps, having internal globular bearings, in which are seated balls having a duct forming a ball and socket joint. A cupped washer is inserted in each cap, pressing against the balls from their diametrical position inwards and the ends of the tubular body engaging the outside edge of the cups. Presser rings are held tightly on the balls by a single strong spring and pipes lead from the balls to another similar joint or device.

Other objects and advantages will be more specifically described in the following detailed description.

In the annexed drawings in which my invention is illustrated:

Figure 1 is a side view showing the joint applied to a lubricating device.

Figure 2 is a longitudinal sectional view of my joint.

Figure 3 is a plan view of the presser rings, showing the by-pass grooves.

Referring more particularly to the drawings, the joint consists of a tubular body 1 and caps 2 and 3 threaded upon either end thereof. Suitable compressible washers 4 and 5 are positioned between the flange of body 1 and the caps 2 and 3 respectively, to prevent leakage of the oil. Apertures 6 and 7 are formed in the ends of the caps 2 and 3 respectively, and balls 8 are seated in these apertures. Pipes 9 are threaded into the balls, the bores of the pipes communicating with ducts 10 formed in the balls.

To prevent leakage around the balls 8, cup washers 11 are positioned within caps 2 and 3 to fit snugly against the balls. Presser rings 12 and 13 are positioned in the body 1 at either end thereof, and are seated against the inner surface of the balls 8. A spring 14 is positioned between the presser rings 12 and 13 and forces said rings outwardly against the balls 8.

The maximum inner diameter of cup washers 11 is equal to the diameter of balls 6, so that each washer contacts with the corresponding ball over a zone bounded by a great circle and a parallel small circle. The outer flanges of the cup washers bear against the cylindrical inner surface of caps 2 and 3 and against the ends of the tubular body 1, thus retaining the washers in position.

When pressure is exerted in the container 15 the grease will be forced through the pipes 9 and body 1, and will force the balls against the caps 2 and 3 and thus will prevent leakage around the balls. The cup washers 11 also press against the balls to prevent leakage. It will be seen that the pipes 9 may be turned in any direction required in the lubricating operation. The end pipe has a sleeve 16 secured thereon which engages the usual nipple on the bearing.

Radial grooves 17 are formed in the faces of the presser rings 12 and 13 to permit passage of grease between the balls 8 and the washers.

Having described my invention, I claim:

1. A flexible joint comprising two tubes terminating in balls, an annular cup slidable on each tube and formed with a central seat in the bottom allowing one-half of the ball to revolvably rest therein, while the side of the cup is spaced from the projecting half of the ball so as to form an annular groove therewith, a cup washer in the groove having flanges fitting the walls of the groove respectively, a sleeve allowing two cups to be threaded thereon from opposite sides, and having its inner edge tapered to bear on the outer flanges of the cup washer; while exposing the inner flanges to a pressure medium passing thru the joint, and spring-separated presser rings bearing against the projecting sections of the ball and grooved along the ball surface to allow the pressure medium to pass below the same to the cup washer.

2. In combination, a cylindrical sleeve, inwardly chamfered at both ends and having a centrally disposed exterior annular flange, said sleeve being externally threaded at both ends, an internally threaded cap cooperating with each end of said sleeve and having an axially disposed aperture and internal spherical seat, spherical members provided with apertures therethrough, pipes fixed in said apertures and extending through the apertures in said caps, said spherical members cooperating with said spherical seats, spherically seated, centrally apertured thrust members cooperating with said spherical members, an interposed compression spring between said thrust members, the spherical seats of said thrust members having radial grooves formed therein, and packing cooperating between said caps and said spherical members.

In testimony whereof I affix my signature.

WALTER F. HUNDEMER.